(12) United States Patent
Jung (10) Patent No.: US 11,429,178 B2
(45) Date of Patent: Aug. 30, 2022

(54) ELECTRONIC DEVICE AND METHOD FOR DETERMINING OPERATING FREQUENCY OF PROCESSOR

(71) Applicant: Samsung Electronics Co., Ltd., Gyeonggi-do (KR)

(72) Inventor: Sunchul Jung, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 42 days.

(21) Appl. No.: 16/718,502

(22) Filed: Dec. 18, 2019

(65) Prior Publication Data

US 2020/0264683 A1 Aug. 20, 2020

(30) Foreign Application Priority Data

Feb. 19, 2019 (KR) .................. 10-2019-0019532

(51) Int. Cl.
*G06F 1/32* (2019.01)
*G06F 1/324* (2019.01)
(Continued)

(52) U.S. Cl.
CPC .............. *G06F 1/324* (2013.01); *G06F 1/329* (2013.01); *G06F 1/3243* (2013.01); *G06F 2101/14* (2013.01)

(58) Field of Classification Search
CPC ......... G06F 1/324; G06F 1/3243; G06F 1/329
See application file for complete search history.

(56) References Cited

U.S. PATENT DOCUMENTS 7,131,016 B2 10/2006 Oh et al.
7,720,643 B1 5/2010 Becker
(Continued)

FOREIGN PATENT DOCUMENTS

CN 103150215 B 3/2016

OTHER PUBLICATIONS

Corbet, Jonathan, "Per-entity load tracking", https://lwn.net/Articles/531853/, Jan. 9, 2013.*
(Continued)

*Primary Examiner* — Jaweed A Abbaszadeh
*Assistant Examiner* — Cheri L Harrington
(74) *Attorney, Agent, or Firm* — Cha & Reiter, LLC (57) ABSTRACT

According to an embodiment of the disclosure, an electronic device includes a processor and a memory operationally connected to the processor and configured to store instructions that, when executed by the processor, cause the processor to configure a time period comprising multiple unit durations, check for utilization of the processor for each of the multiple unit durations of the time period, collect at least one variation of the utilization of the processor based on the utilization of the processor for each of the multiple unit durations, acquire a temporal probability density function based on the at least one collected variation, determine a probability density function corresponding to the temporal probability density function based on a previously stored probability density function table, and determine an operating frequency for a next unit duration based on at least part of the identified probability density function. Various other embodiments are possible.

17 Claims, 7 Drawing Sheets

(51) Int. Cl.
 *G06F 1/3234* (2019.01)
 *G06F 1/329* (2019.01)

(56) References Cited

U.S. PATENT DOCUMENTS

| | | | | |
|---|---|---|---|---|
| 8,127,298 | B2* | 2/2012 | Kato | G06F 1/206 |
| | | | | 718/104 |
| 8,578,023 | B2 | 11/2013 | Satterfield et al. | |
| 9,292,070 | B2 | 3/2016 | Wu | |
| 9,785,481 | B2 | 10/2017 | Muckle et al. | |
| 9,811,389 | B2* | 11/2017 | Rider | G06F 1/329 |
| 2003/0204758 | A1* | 10/2003 | Singh | G06F 1/3203 |
| | | | | 713/320 |
| 2003/0204759 | A1* | 10/2003 | Singh | G06F 1/3203 |
| | | | | 713/320 |
| 2004/0163000 | A1* | 8/2004 | Kuhlmann | G06F 1/3203 |
| | | | | 713/300 |
| 2008/0201591 | A1* | 8/2008 | Hu | G06F 1/3203 |
| | | | | 713/323 |
| 2008/0229127 | A1* | 9/2008 | Felter | G06F 1/3296 |
| | | | | 713/320 |
| 2009/0132840 | A1* | 5/2009 | Talwar | G06F 9/45558 |
| | | | | 713/340 |
| 2009/0150695 | A1* | 6/2009 | Song | G06F 1/28 |
| | | | | 713/323 |
| 2009/0150696 | A1* | 6/2009 | Song | G06F 1/329 |
| | | | | 713/323 |
| 2009/0177903 | A1* | 7/2009 | Rozen | G06F 1/3296 |
| | | | | 713/322 |
| 2011/0004575 | A1* | 1/2011 | Yang | G06F 1/324 |
| | | | | 713/320 |
| 2011/0113269 | A1* | 5/2011 | Park | G06F 1/3296 |
| | | | | 713/310 |
| 2011/0126206 | A1* | 5/2011 | Kato | G06F 9/505 |
| | | | | 718/103 |
| 2014/0086053 | A1* | 3/2014 | Noro | G06F 1/324 |
| | | | | 370/235 |
| 2016/0026507 | A1* | 1/2016 | Muckle | G06F 9/5094 |
| | | | | 718/104 |
| 2016/0292015 | A1 | 10/2016 | Shah et al. | |
| 2016/0323098 | A1* | 11/2016 | Bathen | H04L 63/00 |
| 2017/0083383 | A1* | 3/2017 | Rider | G06F 9/4893 |
| 2021/0208663 | A1* | 7/2021 | Cooper | G06F 1/3234 |

OTHER PUBLICATIONS

"EAS Overiew and Integration Guide" v1.6, ARM Ltd, 2018.*
International Search Report dated Mar. 16, 2020.

* cited by examiner

ELECTRONIC DEVICE AND METHOD FOR DETERMINING OPERATING FREQUENCY OF PROCESSOR

CROSS-REFERENCE TO RELATED APPLICATION(S)

This application is based on and claims priority under 35 U.S.C. 119 to Korean Patent Application No. 10-2019-0019532 filed on Feb. 19, 2019 in the Korean Intellectual Property Office, the disclosures of which are herein incorporated by reference in their entireties.

BACKGROUND

1) Field

One or more disclosed embodiments generally relate to an electronic device and method for determining an operating frequency of a processor.

2) Description of Related Art

Modern processors may be designed to operate in a number of different operating frequencies and voltage configurations. Because power consumption increases as the operating frequency and voltage increase, there is a trade-off between the processing capacity (the number of instructions that can be executed over time) and reduced energy consumption.

Even though it may be preferred or even necessary to run a program at maximum processing capacity, maintaining the maximum processing capacity of the processor for a long time without utilizing it entirely is likely to be regarded as wasteful in most cases. It may also be physically impossible to maintain the maximum processing capacity of the processor for an extended period of time due to external system restrictions such as thermal and power supply capacity restrictions.

In these situations, there is a hardware interface allowing the processor to be switched between different frequency-voltage configurations. Typically, this interface is used along with an algorithm to estimate the required processing capacity of the processor to determine an operating frequency-voltage configuration. Because the utilization of the system generally changes over time, the above operation should be performed repeatedly on a regular basis. The above operations are referred to as processor performance scaling or processor frequency scaling.

SUMMARY

For optimal frequency scaling, an operating system (OS) kernel may be able to provide various scaling governors. For example, a recently introduced scaling governor is capable of estimating the utilization of the processor using a per-entity load tracking (PELT) metric, which make it possible for the scaling governor to calculate frequency f from Equation 1:

$$f = \frac{5}{4} \times f_0 \times \frac{util}{max} \quad \text{[Equation 1]}$$

where util denotes the utilization of the processor that is obtained with the PELT metric, $f_0$ denotes the maximum possible operating frequency, and max denotes the theoretical maximum utilization of the processor that is obtained from $f_0$ through linear estimation.

In Equation 1, it is assumed that the proportional constant between the frequency and the utilization of the processor is 5/4. This may mean that it is expected for the increase of load to not exceed ¼ of the current utilization even though the utilization of the processor is randomly changed.

Using such a proportional constant, if the margin of load at a previous time period*¼ is less than the margin of increase of the load of at the next time period, this may cause a bottleneck of the processor capacity.

But if the change in load at the next time period is slight compared with the previous load, this may cause energy waste.

According to various embodiments of the disclosure, an electronic device includes a processor and a memory operationally connected to the processor and configured to store instructions that, when executed by the processor, cause the processor to configure a time period comprising multiple unit durations, check for utilization of the processor for each of the multiple unit durations of the time period, collect at least one variation of the utilization of the processor based on the utilization of the processor for each of the multiple unit durations, acquire a temporal probability density function based on the at least one collected variation, determine a probability density function corresponding to the temporal probability density function based on a previously stored probability density function table, and determine an operating frequency for a next unit duration based on at least part of the probability density function.

According to various embodiments of the disclosure, a method for determining an operating frequency of a processor includes configuring a time period comprising multiple unit durations, checking for utilization of the processor for each of the multiple unit durations of the time period, collecting at least one variation of the utilization of the processor based on the utilization of the processor for each of the multiple unit durations, acquiring a temporal probability density function based on the at least one collected variation, determining a probability density function corresponding to the temporal probability density function based on a previously stored probability density function table, and determining an operating frequency for a next unit duration based on at least part of the probability density function.

According to various embodiments, an electronic device includes a processor and a memory operationally connected to the processor and configured to store instructions that, when executed by the processor, cause the processor to check for utilization variation of the processor for a predetermined previous duration, determine unpredictability related to utilization of the processor based on the utilization variation, and determine an operating frequency of the processor for a next duration based on the unpredictability.

Additional aspects will be set forth in part in the description which follows and, in part, will be apparent from the description, or may be learned by practice of the presented embodiments.

BRIEF DESCRIPTION OF THE DRAWINGS

In the drawings, the same or similar reference numerals may be used for the same or similar components.

The above and other aspects, features, and advantages of certain embodiments of the present disclosure will be more apparent from the following description taken in conjunction with the accompanying drawings, in which.

DETAILED DESCRIPTION

Figure 1:
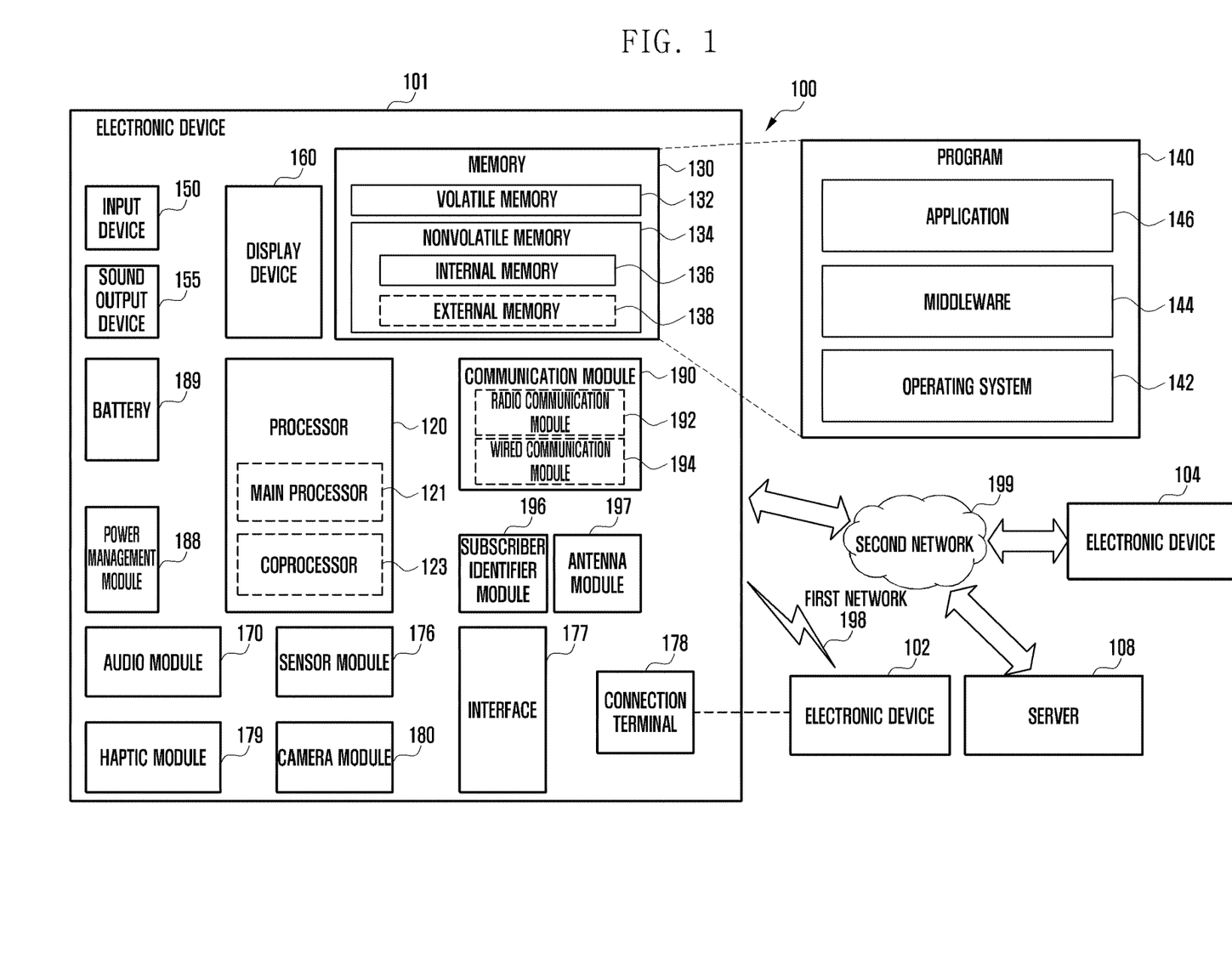
FIG. 1 is a block diagram illustrating a configuration of an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one antenna including a radiator made of a conductor or a conductive pattern formed on a substrate (e.g., a PCB). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna. In some embodiments, a part of the antenna module 197 may be formed of other components (e.g., RFIC) than the radiator.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
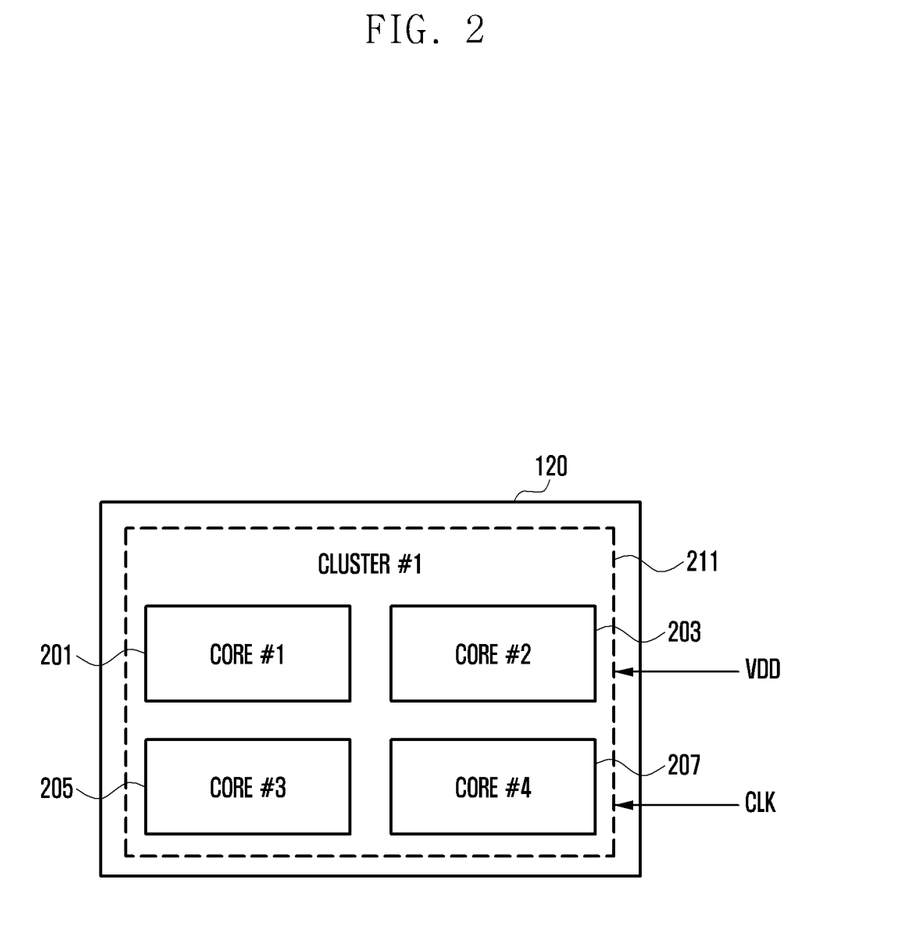
FIG. 2 is a block diagram illustrating a configuration of a processor according to an embodiment.

FIG. 2 is a block diagram illustrating a configuration of a processor according to an embodiment.

According to an embodiment, the processor (e.g., including processing circuitry) 120 may include the smallest unit devices (e.g., cores) for executing and processing instructions inside the processor 120. For example, the processor 120 may include central processing units (CPUs). According to an embodiment, the processor 120 may be a homogenous multi-core processor or a heterogeneous multi-core processor. A multi-core processor may be a computing component including at least two independently-operating cores (e.g., Core #1 201, Core #2 203, Core #3 205, and Core #4 207). Each core can independently read and execute program instructions. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101

According to an embodiment, the processor 120 may create a set (e.g., cluster) of CPUs sharing scaling hardware represented by a logical policy object and perform scaling on the set of CPUs. For example, a system composed of independent CPUs (e.g., Core #1 201, Core #2 203, Core #3 205, and Core #4 207) may be expressed as a CPU set (e.g., Cluster #1 211). In an embodiment, a system composed of a single CPU may be expressed as a CPU set. For example, regardless of their design, the processors can be represented by a set of CPUs in hardware to carry out performance scaling thereon. For example, the individual CPUs may share a predetermined policy object, and the processor 120 may carry out performance scaling on the set of CPUs sharing the predetermined policy object.

According to an embodiment, a CPU set may be expressed as a single power domain operating at a driving clock (CLK) and a driving voltage (VDD). For example, it may be possible to aggregate processing loads of the individual cores or check for the processing load of a representative core among the multiple cores to determine a single processing load. The processor 120 may determine a driving clock frequency and driving voltage (VDD) level for use in the single power domain based on the single processing load. For example, it may be possible to use dynamic voltage frequency scaling (DVFS), which increases the driving clock (CLK) frequency and driving voltage (VDD) level for the single power domain as the time required for processing tasks increases.

Figure 3:
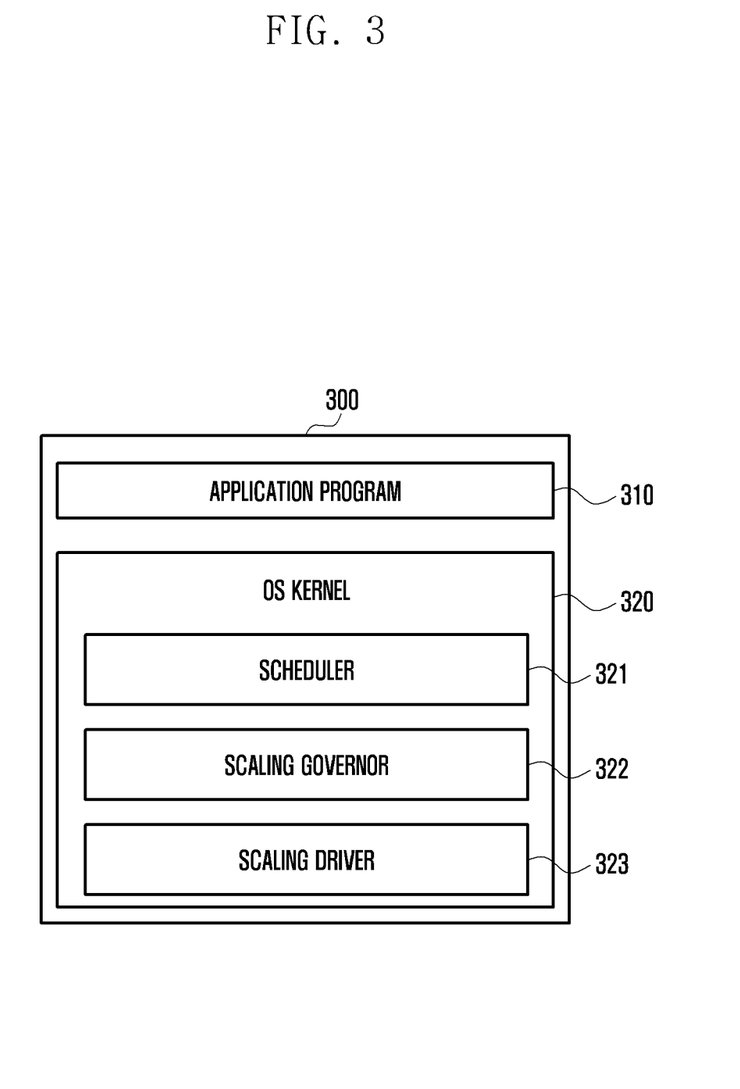
FIG. 3 is a block diagram illustrating platform architecture according to an embodiment.

FIG. 3 is a block diagram illustrating platform architecture according to an embodiment.

In the embodiment of FIG. 3, the platform architecture 300 may include at least one of an application program 310 and a kernel 320. According to an embodiment, the platform architecture 300 may be stored in the memory 130 and loaded and executed by the processor 120 of FIG. 1.

According to an embodiment, the application program 310 (e.g., application 146 in FIG. 1) may include software on an upper layer (e.g. user space) that is run as a basic service or run based on user requests. In order to provide various services, multiple application programs may be simultaneously executing. The application program 310 may create multiple threads or run queues, by way of example.

According to an embodiment, the kernel 320 is a component of an OS (e.g., OS 142 in FIG. 1) and may perform control operations between the application program 310 and hardware. The kernel 320 may be responsible for managing at least one of program execution, interrupts, multi-tasking, memory management, file system, and device drivers. In the instant disclosure, among the various components of the kernel 320, descriptions are made only for the scheduler 321, scaling governor 322, and scaling driver 323, i.e. descriptions of other components of the kernel 320 are omitted.

According to an embodiment, the scheduler 321 assigns multiple threads or run queues in use by the application program 310 to individual cores of the multi-core processor 120. The scheduler 321 may monitor the application program 310 and OS for scheduling events. If a scheduling event is generated, the scheduler 321 may assign the corresponding task to one of the multiple cores (e.g., Core #1 201 to Core #4 207) based on the average load of the multiple threads or run queues to be scheduled.

According to an embodiment, the scaling governor 322 may determine a driving voltage and/or driving clock of the processor 120. For example, the scaling governor 322 of the kernel 320 may determine a driving voltage and/or driving clock of a set of CPUs. In an embodiment, the scaling governor 322 may determine a driving voltage and/or driving clock of each of multiple CPUs. According to an embodiment, the scaling governor 322 may adjust the driving voltage and driving clock frequency of the processor 120 in response to a request from the kernel 320 or the scheduler 321. The scaling governor 322 may interoperate with a policy object or scaling driver in use by the system to determine driving voltage and/or driving clock according to characteristics of the performance scaling algorithm implemented by the policy object or scaling driver.

According to an embodiment, the scaling governor 322 may configure a time period composed of multiple unit durations. For example, the scaling governor 322 may configure a moving window on a time axis to designate multiple unit durations. According to an embodiment, the unit duration may be defined by a number of scheduler ticks. For example, a tick interval of the scheduler may be 1 ms (1024 μs). According to an embodiment, one unit duration may be defined as 1 PELT segment.

According to an embodiment, the scaling governor 322 may check for the utilization (or utilization rate) of the processor 120 for each of the unit durations in the time period. For example, the scaling governor 322 may check for the utilization of the processor 120 for each of multiple unit durations using the predetermined CPU load computing metric (e.g., PELT metric).

According to an embodiment, the scaling governor 322 may collect at least one variation of utilization of the processor 120 based on the utilization of the processor 120 that is identified for each of the multiple unit durations. For example, the scaling governor 322 may collect a variation of the utilization for consecutive unit durations.

According to an embodiment, the scaling governor 322 may obtain a temporal probability density function (PDF) based on the at least one collected variation. For example, the scaling governor 322 may obtain the temporal PDF based on the statistics of the variations during the time period.

According to an embodiment, the scaling governor 322 may determine an index of a function (e.g., PDF) corresponding to the temporal PDF based on a previously stored probability density function table. For example, the scaling governor 322 may acquire an index of the function closest in information to the temporal PDF from the set of probability density functions Ω to determine unpredictability of a utilization variation of the processor 120.

According to an embodiment, the scaling governor 322 may determine an operating frequency for the next unit duration at least based on the determined function. For example, the scheduling governor 322 may determine the operating frequency of the processor 120 for the next duration based on the unpredictability.

According to an embodiment, the kernel 320 may include at least one scaling driver 323 that is capable of being selected according to a call from the scaling governor 322. The scaling driver 323 may be invoked directly from scheduler context or asynchronously via a separate kernel thread or work queue mechanism. According to an embodiment, the scaling driver 323 may control the driving clocks or driving voltages of the processor 120 and other components in a hardware-wise manner according to the invocation from the kernel 320. For example, the scaling driver 323 may receive an operating frequency from the scaling governor 322 and perform a subjective mapping with the hardware-supportable frequency.

Figure 4:
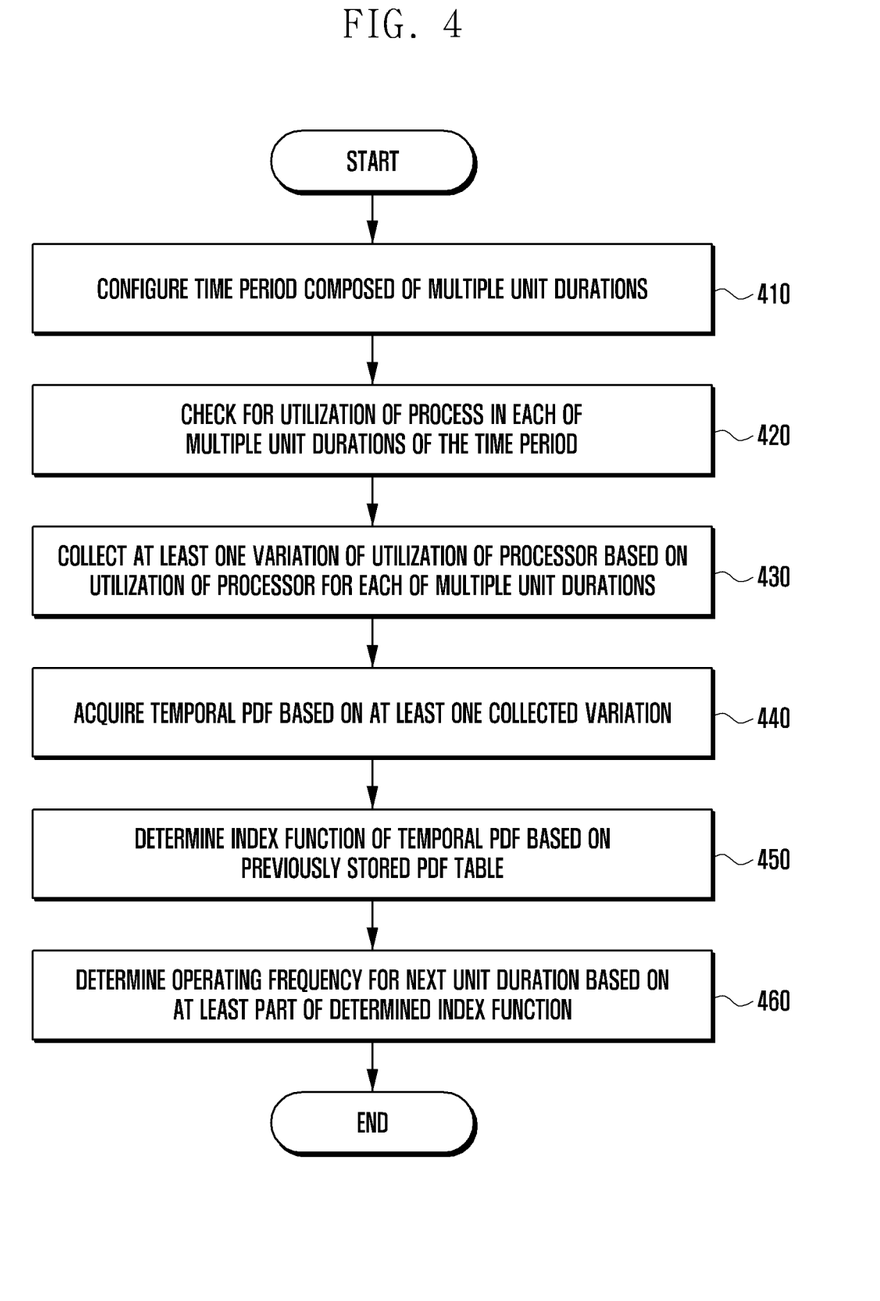
FIG. 4 is a flowchart illustrating a method for determining an operating frequency of a processor according to an embodiment.

FIG. 4 is a flowchart illustrating a method for determining an operating frequency of a processor according to an embodiment.

In the embodiment of FIG. 4, operations 410 to 460 are described on the basis of the configuration of the electronic device 101 in FIG. 1.

In reference to FIG. 4, the processor 120 (e.g., scaling governor 322 in FIG. 3) of the electronic device 101 may configure, at operation 410, a time period composed of multiple unit durations.

According to an embodiment, a unit duration may be defined by a number of scheduler ticks. For example, the tick interval of the scheduler is 1 ms (1024 μs). According to an embodiment, one unit duration may be defined as 1 PELT segment.

According to an embodiment, the time period may be composed of a plurality of unit durations. According to an embodiment, the time period may be conceptualized as a window, which moves on the time axis to designate multiple unit durations. For example, the time period may designate N unit durations counted back from the current point in time.

According to an embodiment, the processor 120 may configure multiple time periods. In this case, the processor may determine a trend in the utilization variation of the processor 120 in each of the multiple time periods. The processor 120 may estimate randomness in the utilization variation of the processor 120 based on the trend in the utilization variation in each of the multiple time periods. The processor 120 may also determine a more advantageous operating frequency based on the estimated randomness in the utilization variation.

According to an embodiment, the processor 120 (e.g., scaling governor 322) of the electronic device 101 may check, at operation 420, for the utilization of the processor 120 in each of the multiple unit durations of the time period. For example, the processor 120 may check for the utilization of the processor 120 in each of the multiple unit durations using a predetermined CPU load computing formula (e.g., PELT metric).

According to an embodiment, the processor 120 may determine a utilization of the processor 120 based on at least one of the utilization of a set of CPUs (Cluster #1 211 in FIG. 2) sharing a predetermined policy object and the utilization of a representative CPU (e.g., Core #1 201, Core #2 203, Core #3 205, or Core #4 207) selected from the CPU set.

According to an embodiment, the processor 120 (e.g., scaling governor 322) of the electronic device 101 may collect, at operation 430, at least one variation of utilization of the processor 120 based on the utilization of the processor 120 that is identified for each of the multiple unit durations. According to an embodiment, the processor 120 may collect a variation of utilization for consecutive unit durations. For example, the variation v of utilization of the processor 120 at unit duration i may be calculated using Equation 2.

$$v = k \times (util_i - util_{(i-1)}) \quad \text{[Equation 2]}$$

In Equation 2, $util_i$ denotes the utilization of the processor 120 in the $i^{th}$ unit duration, $util_{i-1}$ denotes the utilization of the processor 120 in the $(i-1)^{th}$ unit duration, and k denotes a scale factor. According to an embodiment, in one example, the scale factor k may be a value relative to the maximum variation of the utilization centered around 0.

According to an embodiment, the processor 120 (e.g., scaling governor 322) of the electronic device 101 may acquire, at operation 440, a temporal PDF based on the at least one collected variation. In order to express characteristics of the variation of utilization of the processor 120 in the form of a temporal PDF, a predetermined number of samples are required. For example, a variation may become a sample. That is, it is necessary to acquire multiple variations in order to express characteristics of utilization variation of the processor 120 in the form of a temporal PDF. According to an embodiment, the sample amount may be predetermined based on the number of unit durations constituting the time period, and the processor 120 may acquire the temporal PDF using statistics of variations during the time period.

According to an embodiment, the processor 120 may quantize probability variables to predetermined steps (or level) to generate only integer-type data. For example, it may be possible to acquire a binary temporal PDF. The processor 120 may perform integral calculus on the entire durations such that the temporal PDF is expressed in the form of an integer (e.g., 2) to the power 2.

According to an embodiment, the processor 120 (e.g., scaling governor 322) of the electronic device 101 may determine, at operation 450, an index of a function corresponding to the temporal PDF based on a previously stored probability density function table.

According to an embodiment, the memory 130 may store the probability density function table. For example, the processor 120 may generate (or induce) a time-independent probability density function Ω based on the impact of the characteristic of task load and/or the operating frequency for the $i^{th}$ unit duration on the utilization of the processor 120 for the $(i+1)^{th}$ unit duration. The processor 120 may adjust dispersion and localization parameters such that the generated probability density function Ω changes from delta function to uniform function, and it may store the adjusted result in the probability density function table. For example, the memory 130 may store a set of probability density functions Ω in the probability density function table.

According to an embodiment, the processor 120 may compare the temporal PDF with the multiple probability density functions Ω stored in the probability density function table. For example, the processor 120 may retrieve a function closest in information to the temporal PDF from the set of probability density functions Ω. According to an embodiment, the processor 120 may retrieve a probability density function having the least relative entropy with respect to the temporal PDF. For example, it may be possible to determine a similarity between two probability variables based on the Kullback-Leibler Divergence indicating the relative entropy between the two probability variables.

According to an embodiment, the processor 120 may acquire an index of the function closest in information to the temporal PDF to determine an unpredictability of the utilization variation of the processor 120. For example, as the unpredictability increases, the utilization variation of the processor 120 is likely to increase in the next unit duration.

According to an embodiment, the processor 120 (e.g., scaling governor 322) of the electronic device 101 may determine, at operation 460, an operating frequency for the next unit duration based on at least part of the determined function.

According to an embodiment, the processor 120 may determine the unpredictability of utilization variation of the processor 120 based on the function. For example, the processor 120 may estimate whether the utilization variation of the processor 120 for the next unit duration will be large or small.

According to an embodiment, the processor 120 may determine an operating frequency of the processor 120 for the next unit duration based on the determined unpredictability. For example, the processor 120 may dynamically adjust the operating frequency according to the determined unpredictability.

According to an embodiment, the processor 120 may make different determinations depending on whether the determined unpredictability satisfies a predetermined threshold value. For example, the processor 120 may select an operating frequency higher than the current operating frequency in use when the unpredictability satisfies the predetermined threshold value. Alternatively, the processor 120 may select an operating frequency lower than the current operating frequency in use for the case where the unpredictability does not satisfy the predetermined threshold value. According to an embodiment, the processor may have a linear or non-linear operating frequency inference strategy for the unpredictability. For example, the processor 120 may select an operating frequency higher than the current operating frequency in proportion to the unpredictability for the case where the unpredictability is greater than a predetermined threshold value. In an embodiment, the processor 120 may decrease the operating frequency at a predetermined rate for the case where the unpredictability is less than a predetermined threshold value.

According to an embodiment, the operating frequency $f_{i+1}$ of the processor 120 for the next unit duration i+1 may be calculated based on Equation 3.

$$\mathrm{argmin}_{f_{(i+1)}}[\alpha \int_0^\infty \mathrm{Pr}_\sigma(u_{(i+1)}|\downarrow u_i, f_{(i+1)}) dx + \beta f_{(i+1)}]$$ [Equation 3]

In Equation 3, α may denote a weight for capacity bottleneck cost, and β may denote a weight for energy waste cost. Assuming that $f_{i+1}$ is the operating frequency of the processor 120 for the next unit duration, $u_i$ may denote the utilization variation of the processor 120 that is observed until the $i^{th}$ unit duration, and $u_{i+1}$ may denote the utilization variation of the processor 120 for the $(i+1)^{th}$ unit duration. In Equation 3, σ a may denote randomness. Although the integration interval from 0 to infinity is assumed in Equation 3, it is based on approximation; in another embodiment, the integration interval may be from $\downarrow u_{i+1}$ to $u_{max}$. According to an embodiment, the processor 120 may determine the operating frequency $f_{i+1}$ minimizing the above function in consideration of the above variables.

Figure 5A:
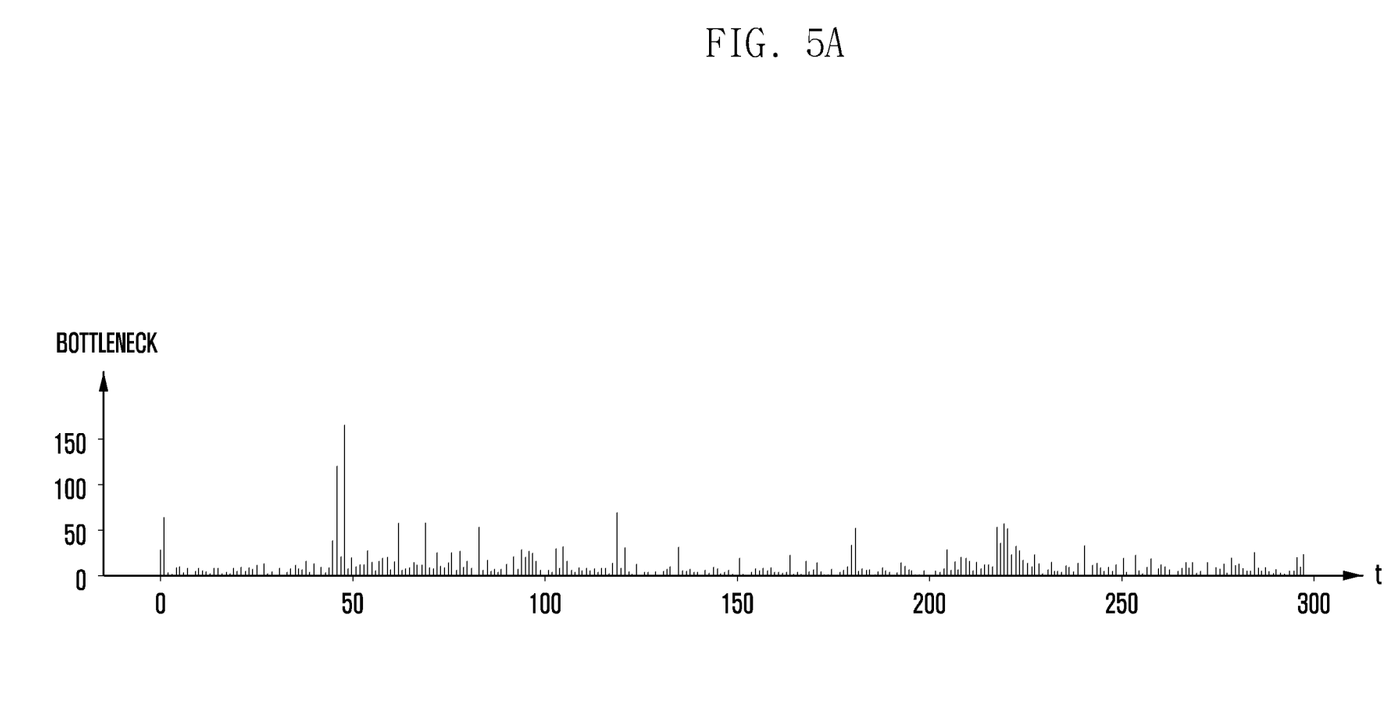
FIGS. 5A and 5B are graphs comparing changes in the number of bottleneck events occurring with a conventional scaling governor and the proposed scaling governor according to an embodiment when the same task load is input.
Figure 5B:
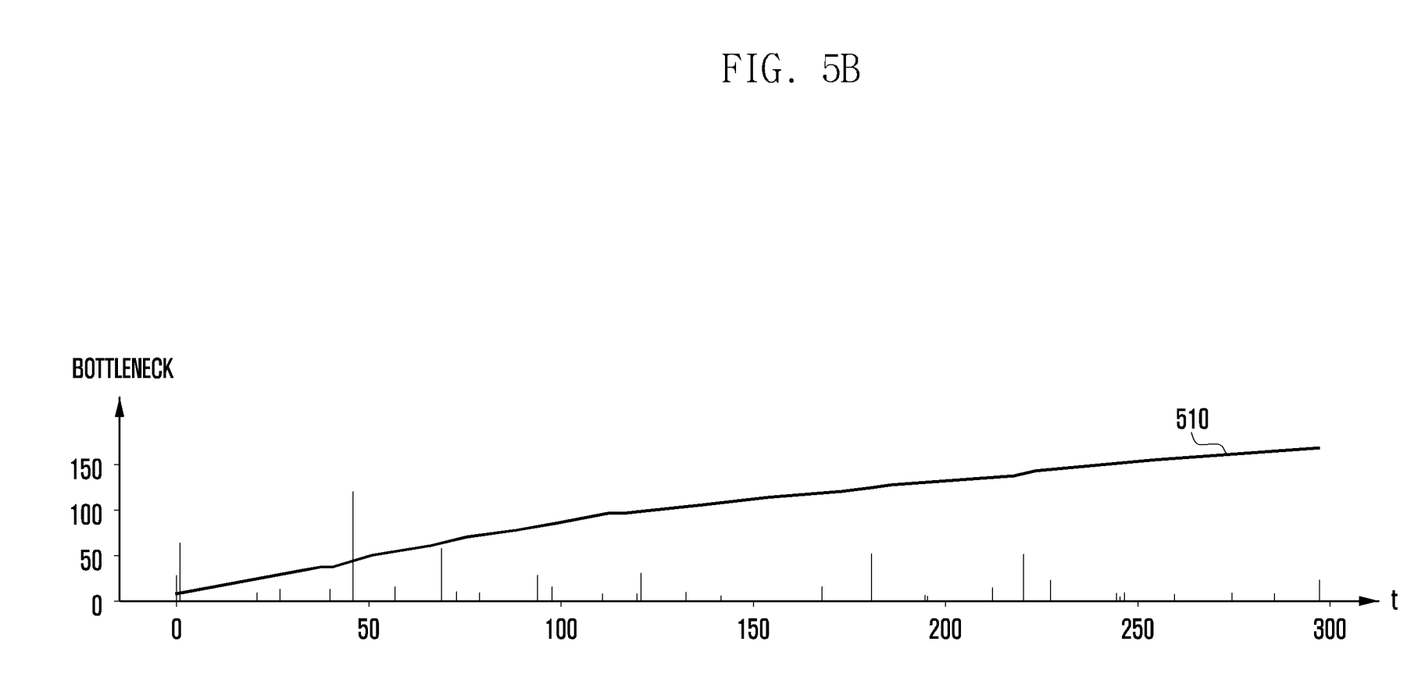

FIGS. 5A and 5B are graphs comparing changes in the number of bottleneck events occurring with a conventional scaling governor and the proposed scaling governor in the electronic device 101 when the same task load is input.

FIGS. 5A and 5B show results of capacity measurements with a PCMark benchmark selected as an application program combining best effort (BE) and DeadLine (DL) tasks.

FIG. 5A shows the case where the conventional scaling governor is used. For example, the bars in the graph indicate the number of bottleneck events at various time intervals.

FIG. 5B shows the case where the scaling governor proposed in one or more disclosed embodiments is used. In comparison with the case of FIG. 5A, it can be seen that the number of bottleneck events is dramatically reduced.

The graphs show that the scaling governor proposed in the one or more disclosed embodiments is superior because it takes into account statistical differences in the energy-performance ratio. For example, the curve 510 shows accumulations of values obtained by subtracting the operating frequencies of the processor 120 that are estimated by the scaling governor proposed in the one or more disclosed embodiments from the operating frequencies of the processor 120 that are estimated by the conventional scaling governor. The curve 510 may prove the improvement of the processing capacity of the processor and the energy consumption energy-performance ratio through energy consumption reduction.

Figure 6:
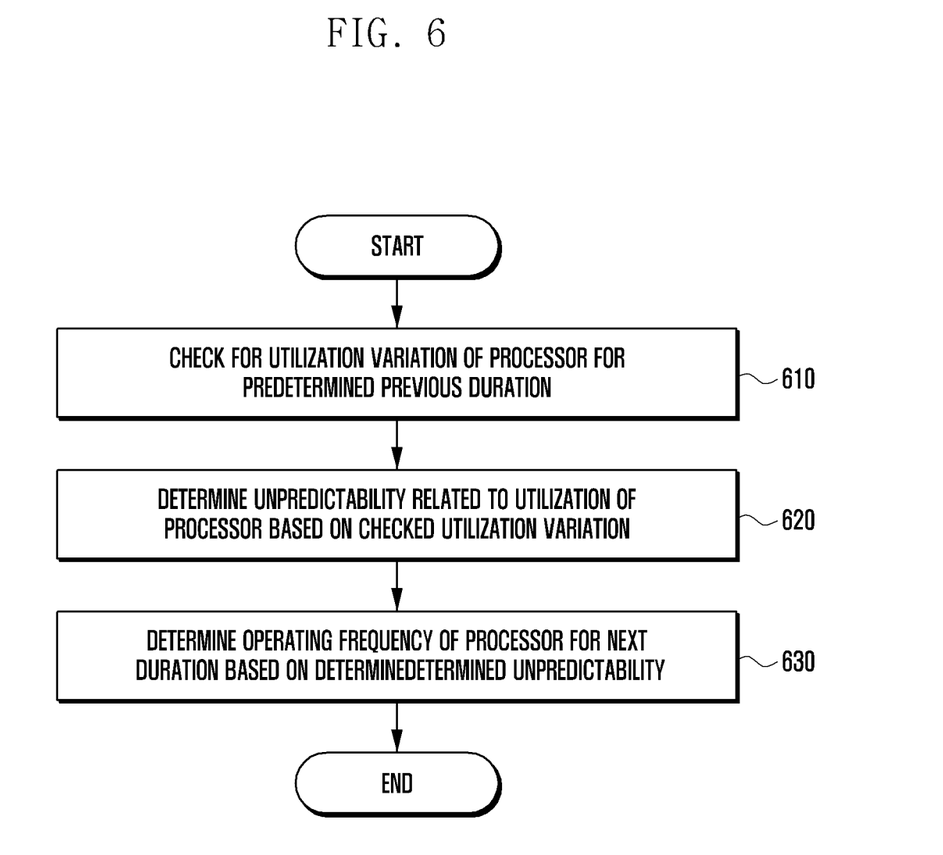
FIG. 6 is a flowchart illustrating a method for determining an operating frequency of a processor according to an embodiment.

FIG. 6 is a flowchart illustrating a method for determining an operating frequency of a processor according to an embodiment.

In the embodiment of FIG. 6, operations 610 to 630 are described on the basis of the configuration of the electronic device 101 in FIG. 1.

In reference to FIG. 6, the processor 120 (e.g., scaling governor 322 in FIG. 3) of the electronic device 101 may check, at operation 610, for a utilization variation of the processor 120 for a predetermined previous duration.

For example, the processor 120 may configure a time period composed of multiple unit durations, check for the utilizations of the processor for each of the unit durations, collect at least one utilization variation of the processor based on the utilizations for the respective unit durations, and acquire a temporal PDF based on the at least one utilization variation collected.

According to an embodiment, the processor 120 (e.g., scaling governor 322 in FIG. 3) of the electronic device 101 may determine, at operation 620, an unpredictability related to the utilization of the processor 120 based on the checked utilization variations.

For example, the processor 120 may determine an index of a function (e.g., PDF) corresponding to a temporal PDF based on a previously stored probability density function table and determine an unpredictability of the utilization variation of the processor 120 based on the function.

According to an embodiment, the processor 120 (e.g., scaling governor 322 in FIG. 3) of the electronic device 101 may determine, at operation 630, an operating frequency of the processor 120 for the next duration based on the determined unpredictability.

According to an embodiment, the processor 120 may dynamically adjust the operating frequency according to the determined unpredictability. For example, the processor 120 may estimate whether the utilization variation of the processor 120 for the next unit duration will be large or small. For example, the processor 120 may estimate the operating frequency with a linear or non-linear unpredictability.

As described above, the electronic device and method for determining an operating frequency of a processor according to certain embodiments of the disclosure is advantageous in terms of improving the energy performance by probability-variablizing the change of the utilization of the processor without as much additional overhead as would be expected with a general statistical analysis or machine learning, instead of applying a relationship assuming that the utilization of the processor is equivalent to the optimal operating frequency.

The electronic device and method for determining an operating frequency of a processor according to certain embodiments of the disclosure is also advantageous in terms of resulting in a superior performance estimation of an application program while reducing an accumulated sum of operation frequencies of the processor that are computed during the total runtime.

The electronic device and method for determining an operating frequency of a processor according to certain embodiments of the disclosure is also advantageous in terms of improving the processing capacity and energy performance of the processor by reducing energy consumption. For example, it is possible to improve the energy-performance ratio.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
   a processor; and
   a memory operationally connected to the processor and configured to store instructions that, when executed by the processor, cause the processor to:
   identify a time period comprising multiple unit durations;
   measure a plurality of utilizations of the processor for each of the multiple unit durations of the time period;
   collect at least one variation of utilization of the processor based on utilization of the processor for each of the multiple unit durations, wherein collecting the at least one variation comprises measuring a difference between consecutive the plurality of utilizations of the processor;
   acquire a temporal probability density function based on the at least one collected variation;
   identify a probability density function corresponding to the temporal probability density function based on a previously stored probability density function table;
   determine a probability that utilization variation of the processor increases or decreases at a next unit duration based on the identified probability density function;
   identify an operating frequency for the next unit duration based on at least part of the determined probability; and
   operate the processor at the operating frequency,
   wherein identifying of the operating frequency comprises:
   selecting an operating frequency higher than a current operating frequency in use based on the determined probability being greater than a predetermined threshold value, and
   selecting an operating frequency lower than the current operating frequency in use based on the determined probability being less than the predetermined threshold value.

2. The electronic device of claim 1, wherein the instructions further comprise an instruction that causes the processor to identify for the plurality of utilizations of the processor using a per-entity load tracking (PELT) metric.

3. The electronic device of claim 2, wherein the unit duration corresponds to a PELT segment.

4. The electronic device of claim 1, wherein the instructions further comprise an instruction that causes the processor to measure the plurality of the utilizations of the processor based on a utilization of a set of central processing units (CPUs) sharing a policy object or a utilization of a representative CPU selected from the set of the CPUs.

5. The electronic device of claim 1, wherein the instructions further comprise an instruction that causes the processor to retrieve a probability density function with a least relative entropy with respect to the temporal probability density function from a probability density function table.

6. The electronic device of claim 1, wherein, when the determined probability is greater than the predetermined threshold value, the selected operating frequency higher than the current operating frequency in use is proportional to the determined probability.

7. The electronic device of claim 1, wherein, when the determined probability is less than the predetermined threshold value, the instructions further comprise an instruction that causes the processor to decrease the current operating frequency in use at a predetermined rate to arrive at the selected operating frequency lower than the current operating frequency in use.

8. The electronic device of claim 1, wherein the unit duration is at least 1024 μs.

9. A method for determining an operating frequency of a processor, the method comprising:
   identifying a time period comprising multiple unit durations;
   measuring a plurality of utilizations of the processor for each of the multiple unit durations of the time period;
   collecting at least one variation of utilization of the processor based on the utilization of the processor for each of the multiple unit durations, wherein collecting the at least one variation comprises measuring a difference between consecutive one of the plurality of utilizations of the processor;
   acquiring a temporal probability density function based on the at least one collected variation;
   identifying a probability density function corresponding to the temporal probability density function based on a previously stored probability density function table;
   determining a probability that utilization variation of the processor increases or decreases at a next unit duration based on the identified probability density function;
   determining an operating frequency for the next unit duration based on at least part of the determined probability; and
   operating the processor at the operating frequency,
   wherein determining of the operating frequency comprises:
   selecting an operating frequency higher than a current operating frequency in use based on the determined probability being greater than a predetermined threshold value, and
   selecting an operating frequency lower than the current operating frequency in use based on the determined probability being less than the predetermined threshold value.

10. The method of claim 9, wherein identifying for utilization of the processor for each of the multiple unit durations of the time period further comprises checking for the utilization of the processor using a per-entity load tracking (PELT) metric.

11. The method of claim 10, wherein the unit duration corresponds to a PELT segment.

12. The method of claim 9, wherein identifying for utilization of the processor for each of the multiple unit durations of the time period further comprises checking for the utilization of the processor based on a utilization of a set of central processing units (CPUs) sharing a policy object or a utilization of a representative CPU selected from the set of the CPUs.

13. The method of claim 9, wherein identifying the probability density function further comprises retrieving a probability density function with a least relative entropy with respect to the temporal probability density function from a probability density function table.

14. The method of claim 9, wherein, when the determined probability is greater than the predetermined threshold value, the selected operating frequency higher than the current operating frequency in use is proportional to the determined probability.

15. The method of claim 9, further comprising:
when the determined probability is less than the predetermined threshold value, decreasing the current operating frequency in use at a predetermined rate to arrive at the selected operating frequency lower than the current operating frequency in use.

16. An electronic device, comprising:
a processor; and
a memory operationally connected to the processor and configured to store instructions that, when executed by the processor, cause the processor to:
measure utilization variation of the processor, wherein the utilization variation is based on a difference between a current utilization and utilization for an immediately preceding duration;
determine a probability that utilization of the processor increases or decreases at a next duration based on the utilization variation;
determine an operating frequency of the processor for the next duration based on the determined probability; and
operate the processor at the operating frequency,
wherein determine the operating frequency comprises:
select an operating frequency higher than a current operating frequency in use based on the determined probability is greater than a predetermined threshold value; and
select an operating frequency lower than the current operating frequency in use based on the determined probability is less than the predetermined threshold value.

17. The electronic device of claim 16, wherein the instructions further comprise an instruction that causes the processor to estimate the operating frequency with a linear or non-linear unpredictability.

* * * * *